Aug. 13, 1968     E. H. LAND     3,396,646
PHOTOGRAPHIC APPARATUS, PRODUCT AND PROCESS
Filed April 6, 1964     4 Sheets-Sheet 1

INVENTOR.
Edwin H. Land
BY Brown and Mikulka
and
Robert E. Corb
ATTORNEYS

Aug. 13, 1968 E. H. LAND 3,396,646
PHOTOGRAPHIC APPARATUS, PRODUCT AND PROCESS
Filed April 6, 1964 4 Sheets-Sheet 2

INVENTOR.
Edwin H. Land
BY Brown and Mikulka
Robert E. Corb
ATTORNEYS

Aug. 13, 1968     E. H. LAND     3,396,646
PHOTOGRAPHIC APPARATUS, PRODUCT AND PROCESS
Filed April 6, 1964     4 Sheets-Sheet 3

INVENTOR.
Edwin H. Land
BY Brown and Mikulka
Robert E. Corb
ATTORNEYS

Aug. 13, 1968  E. H. LAND  3,396,646
PHOTOGRAPHIC APPARATUS, PRODUCT AND PROCESS
Filed April 6, 1964  4 Sheets-Sheet 4

FIG. 7

INVENTOR.
Edwin H. Land
BY Brown and Mikulka
and
Robert E. Carb
ATTORNEYS

United States Patent Office 3,396,646
Patented Aug. 13, 1968

3,396,646
PHOTOGRAPHIC APPARATUS, PRODUCT
AND PROCESS
Edwin H. Land, Cambridge, Mass., assignor to Polaroid
Corporation, Cambridge, Mass., a corporation of
Delaware
Filed Apr. 6, 1964, Ser. No. 357,391
34 Claims. (Cl. 95—13)

ABSTRACT OF THE DISCLOSURE

A camera is disclosed in which a succession of photosensitive sheets are exposed and following exposure, each sheet is advanced through a container of viscous processing liquid while a separate image-receiving sheet is advanced through the container into superposition with the photosensitive sheet within the container. The photosensitive sheet absorbs sufficient liquid to form a transfer image by a process which commences within the container and the viscous liquid is squeezed from between the superposed sheets as they emerge from the container.

---

This invention relates to novel photographic apparatus for exposing and processing photographic sheet material, products useful in said apparatus and processes performed thereby; and particularly to apparatus, such as cameras, for exposing photographic image-recording sheets and processing the exposed sheets with a liquid in conjunction with second sheets to produce photographic prints, products including the materials employed in such cameras to produce photographic prints and processes performed by the cameras utilizing the products of the invention.

Photographic apparatus, particularly cameras of the type with which the present invention is concerned, generally comprise means for photoexposing an area of a photosensitive image-recording sheet to form an image therein and means for superposing the exposed area of the image-recording sheet with a second sheet and distributing a liquid processing agent in contact with adjacent surfaces of the superposed sheets. The processing liquid preferably effectuates a transfer process in which an imagewise distribution of diffusible image-forming substances is formed in the exposed image-recording sheet and transferred by diffusion to the second sheet to form a visible positive image on the second sheet. The camera, the product including the image-recording and second sheets and the processing liquid and the method of employing the camera and product are especially adapted to produce a color print by a process in which a multilayer image-recording sheet is photoexposed to form a latent image, an aqueous alkaline processing liquid is permeated into the exposed image-recording sheet to render other reagents, particularly developers, reactive to develop the latent image, immobilize diffusible image-forming dyes in exposed areas of the image-recording sheet and transfer image-forming dyes by diffusion from unexposed areas to an image (dye)-receiving layer on the second sheet to form an image in said image-receiving layer.

Heretofore it has been the practice with apparatus, particularly cameras of this type, to expose and process successive areas of a single sheet or to provide a plurality of film units each including the requisite two sheets coupled with one another and in most cases, a container filled with sufficient processing liquid to process the (one) film unit. Each film unit is, accordingly, an assemblage of elements including, in addition to two sheets and a container, other elements such as masks, liquid traps, connecting sheets, leaders and the like.

An object of the invention is to provide a photographic system including apparatus, products and processes, in which the materials required for producing a plurality of photographic transfer prints consists of only one image-recording sheet and one second sheet for each print and a single container holding processing liquid sufficient to form a plurality of prints. The only assembly required in the manufacture of the product is the loading of a stack of image-recording sheets into a lighttight container and assembly and filling of a single container of processing liquid.

Another object of the invention is to provide photographic apparatus, particularly a camera, for exposing a succession of individual image-recording sheets and following exposure of each image-recording sheet, advancing it and a separate second sheet through a container of processing liquid in which at least a layer of the image-recording sheet is permeated with the liquid and pressed into superposition with the second sheet, and advancing the two sheets in superposition from the container and apparatus.

The invention is particularly concerned with the production of multicolor photographic transfer prints according to the process disclosed in U.S. Patent No. 2,983,606, issued May 9, 1961 to Howard G. Rogers and utilizing integral multilayer image-recording sheets incorporating dye developers such as are disclosed in the copending U.S. application of Edwin H. Land and Howard G. Rogers, Ser. No. 565,135, filed Feb. 13, 1956. It has been discovered that print quality can be improved and processing time reduced if the processing liquid employed is permeated into the photosensitive, dye developer containing layers of the image-recording sheet and development of the exposed photosensitive material is advanced to a substantial extent prior to pressing the image-recording sheet in face-to-face contact with the second or image receiving sheet. A partial explanation for this lies in the fact that the prior practice has been to spread a layer of a viscous processing liquid between the sheets. The liquid must then be absorbed from this layer and the image-forming substances must transfer by diffusion through this layer.

Further objects of the invention are: to provide a camera and process in which an exposed image-recording sheet of the type described is moved at a predetermined rate in contact with a body of an aqueous alkaline processing liquid which permeates the image-recording sheet to render photographic developers reactive to advance image formation to a predetermined extent and the sheet is then pressed into face-to-face contact with an image-receiving sheet to form a sandwich which is advanced from contact with the body of liquid in a substantially dry condition externally; and to provide a camera and process as described in which the body of liquid is confined to a container, is viscous, and both sheets are moved into and through the container and in superposition from the container.

Photographic diffusion transfer processes involving two sheets and a processing liquid heretofore have been preformed in one of two basic ways: (1) a viscous processing liquid is distributed between the sheet; and (2) the sheets are immersed in a container of nonviscous liquid and then pressed into superposition. The first process is an essentially dry process in which the viscous liquid does not contact the apparatus, being confined between the sheets and to the means from which it is dispensed, and therefore lends itself to performance in and by apparatus such as a hand-held camera which must be capable of being employed in almost any position. The viscous liquid is spread in a layer between the superposed sheets which are retained together during a processing period of predetermined duration. The second process involves containers, often bulky, of liquid which are easily spilled and such processes are unsuited to hand-held cameras being confined, for the most part, to performance by fixed laboratory processing apparatus and document copiers.

Still further objects of the invention are: to provide photographic apparatus, products and processes suitable for incorporation, use and performance in a hand-held camera combining and incorporating in a novel and unobvious manner the advantageous features of the above-described dry and wet transfer process; and to provide a photographic product including a container of a viscous, jelly-like liquid including a thickening agent; to provide a process in which image-recording and image-receiving sheets are moved through the container to permeate the liquid into the image-recording sheet and the liquid, particularly the thickening agent is removed from the surfaces of the sheets as the sheets are advanced in superposition from the container; and to provide products and processes as described in which the thickening agent is a high molecular weight polymer.

Other objects of the invention will in part be obvious and will in part appear hereinafter.

The invention accordingly comprises the apparatus possessing the construction, combination of elements and arrangement of parts, the product possessing the features, properties and the relation of elements and the process involving the several steps and the relation and order of one or more such steps with respect to each of the others.

For a fuller understanding of the nature and objects of the invention, reference should be had to the following detailed description taken in connection with the accompanying drawings wherein.

Figure 1:
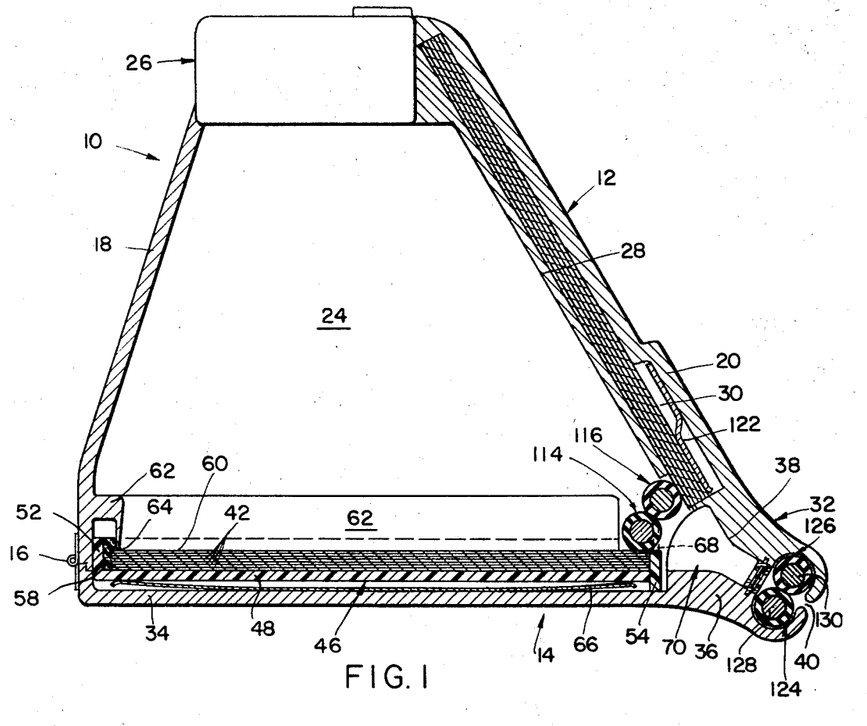
FIGURE 1 is a sectional plan view illustrating apparatus embodying the invention.
Figure 2:
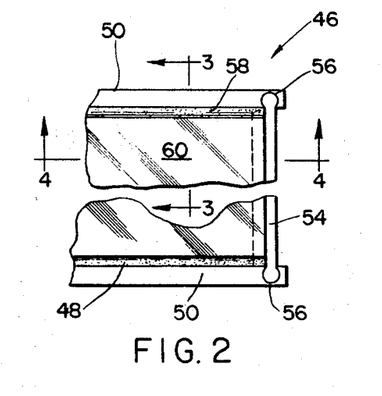
FIG. 2 is a fragmentary plan view of a photographic film assemblage embodying the invention.
Figure 3:
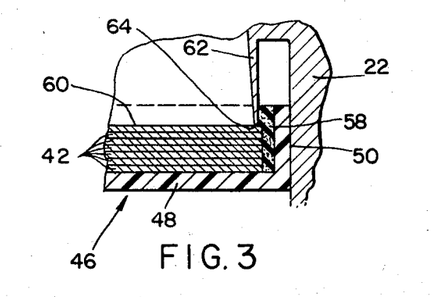
FIGS. 3 and 4 are sectional views taken substantially along the lines 3—3 and 4—4 respectively, of FIG. 2.

Reference is made to FIGURE 1 of the drawings wherein there is an illustrated photographic apparatus in the form of a hand-held camera embodying the invention. The camera, designated 10, comprises a housing having a forward section 12 and a rear section 14 joined together for pivotal movement with respect to one another by a hinge 16. The housing sections are pivotal from the closed or operative position shown in FIGURE 1, to an open position to permit loading of photographic sheet materials into the camera, and are retained in the closed position by suitable latch means (not shown). The forward housing section includes a pair of convergent side walls 18 and 20 and upper and lower walls 22 and 24 cooperating to provide a chamber at the forward end of which is mounted a conventional lens and shutter assembly. The forward housing section includes an inner side wall 28 located adjacent side wall 20 and cooperates with the latter to provide a storage chamber 30 for holding a plurality of photographic sheets (to be described more fully hereinafter); and an extended section 32 projecting rearwardly and to one side adjacent the rear of chamber 30.

The rear housing section 14 comprises a rear wall 34 cooperating with the forward housing section to provide an exposure chamber for enclosing a film assemblage and positioning the film assemblage for exposure; and an end section 36 cooperating with end section 32 of the forward housing section to define a processing chamber 38 communicating with the exposure chamber, and an exit slot 40 communicating with the processing chamber and providing for withdrawal of film units from the camera.

Figure 4:
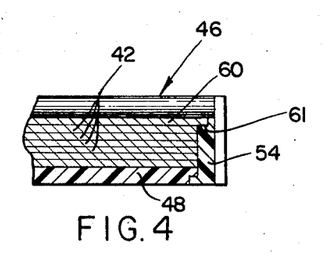

The camera of the invention is designed to expose and process a succession of photographic film units which are of the least complex and inexpensive construction each comprising simply a rectangular photosensitive, image-recording sheet 42, and a second or print-receiving sheet 44 of approximately the same size as the image-recording sheet and separated therefrom. As previously noted, each image-recording sheet 42 comprises a semi-rigid support and one or more layers comprising a photosensitive image-recording material such as silver halide. The support or a layer on the support located outwardly from the photosensitive material is opaque to light actinic to the photosensitive material. A plurality of image-recording sheets are initially provided in stacked relation in a lighttight container 46 shown in FIGS. 1 through 4 as comprising rear wall 48, dependent side walls 50 and a dependent end wall 52 formed integrally with the rear wall; and a movable end wall 54 engaged for sliding movement at its edges in channels 56 in side walls 50. To permit withdrawal of image-recording sheets from the container, end wall 54 is slidable rearwardly from the closed position shown in FIG. 4, in which the end wall is joined to the side walls and rear wall 48 in a lighttight manner. Side walls 50 and end wall 52 are provided with a layer 58 of a pliant light impermeable material such as rubber or a foamed polymer, polyurethane being particularly suitable for this purpose because of its high coefficient of friction and resistance to taking a compression set. Layer 58 functions to frictionally engage the edges of a stack of image-recording sheets 42 held within container 46 in such a way as to support each sheet substantially in a plane and permit sliding movement of each sheet in the plane thereof from the end of the container 46 between the side walls past and forward of end wall 54; and prevent exposure of the image-recording sheet to light leaking around the edges of the sheets between the sheets and rear wall 48 and side walls 50. This system of supporting the sheets within a container requires the sheets to be sufficiently rigid so as not to buckle under the slight inward opposed forces exerted by the deformed material comprising layer 58; and has the advantage of making possible exposure of the photosensitive sheets substantially to their lateral edges thereby effecting a saving in the image-recording sheet material.

The assemblage comprising container 46 and a plurality of image-recording sheets 42 is initially provided with a light-opaque cover sheet 60 as the outermost end sheet of the plurality of sheets engaged at two lateral edges and at one end by layer 58. Cover sheet 60 is slightly longer than the other sheets so that the end of the cover sheet, opposite end wall 52, extends beyond the inner end surface of end wall 54, the end of the cover sheet rests on a ledge or shoulder 61 on the end wall, providing a lighttight cover for the stack of photosensitive sheets. The cover sheet may be secured to the shoulder and is adapted to be removed from the container, following loading of the container into the camera, by sliding cover sheet 60, end first, in the plane thereof from container 46.

Forward housing section 12 of the camera includes locating members 62 positioned for extending rearwardly into container 46 adjacent side walls 50 and end wall 52. The locating members have knife edges 64 located substantially at the focal surface of the lens of assembly 26 and function to locate the foremost (end) image-recording sheet 42 in position for exposure. Locating members 62 are provided with knife edges so that the locating members obscure and prevent exposure of very little of the image-recording sheets where they engage the edges of the image-recording sheets. Springs 66 are provided within the camera housing on the inner surface of rear wall 34 for urging container 46 and the sheets contained therein forward against knife edges 64 of locating members 62 to locate successive image-recording sheets 42 in position for exposure at the focal surface of the lens of assembly 26. The rear portion of the forward housing section is constructed to permit container 46 to move forward under the bias of springs 66, as successive image-recording sheets are withdrawn from the container following exposure within the container, and the locating members to extend rearwardly a sufficient distance to support the rearmost image-recording sheet in position for exposure. The camera also includes a pair of fixed locating pins 68 mounted on support member 69 adapted to engage the end portions of end wall 54 slidably engaged in channels 56 for holding the end wall substantially stationary as the remainder of the container and sheets therein move forward thereby progressively displacing the end wall rearwardly with respect to the container and sheets so that successive sheets may be slidably withdrawn from the container past (forward of) the end wall. Locating pins 68 are positioned so that when the container of image-recording sheets is loaded into the camera and the rear housing section is closed forcing the cover sheet forward against the rear edge of locating members 62, end wall 54 is displaced rearwardly sufficiently to permit the cover sheet to be slid in its plane from the container.

Each exposed image-recording sheet is processed, preferably to produce a full color transfer print, by impregnating the photosensitive layer of the image-recording sheet with a liquid reagent, allowing processing to progress to a predetermined extent and then pressing the liquid impregnated layer of the image-recording sheet into face-to-face contact with an image-receiving sheet to form a sandwich which is advanced from the camera and retained intact during a processing period of predetermined duration. The film assemblage of the invention includes, in addition to container 46 of image-recording sheets and an equal number of image-receiving sheets 44, a container filled with sufficient liquid to process the image-recording sheets comprising the film assemblage. As previously noted, each image-recording sheet includes a multiplicity of layers containing photosensitive material adapted to be photoexposed to form a latent image and dye developers for the photosensitive materials which are rendered reactive by the imbibition of an aqueous alkaline liquid reagent into the layers containing the dye developers. A typical multilayer negative for producing multicolor transfer prints, particularly adapted for incorporation in the film assemblage of the invention and useful in the apparatus and method thereof includes blue-sensitive, green-sensitive and red-sensitive silver iodobromide emulsion layers having positioned behind them, respectively, a yellow dye developer, a magenta dye developer and a cyan dye developer; gelatin interlayers positioned between the yellow dye developer layer and the green-sensitive emulsion and between the magenta dye developer layer and the red-sensitive emulsion; and a support for the emulsion layers, dye developer layers and gelatin interlayers which is preferably impervious to aqueous alkaline liquids and impermeable to light actinic to the emulsion layers. Multilayer negatives of this type are disclosed, for example, in FIG. 9 in the aforementioned U.S. Patent No. 2,983,606.

The image-receiving sheets each comprises a support, preferably of a material which is inert and impermeable to aqueous alkaline liquids, and an image-receiving layer of a material receptive to the aforementioned dye developers, securely adhered to the support. An aqueous alkaline processing liquid suitable for imbibition into the multilayer image-recording sheet to render the reagents, particularly the dye developers therein, reactive, comprises, for example:

| | |
|---|---|
| Water _________________________cc__ | 100.00 |
| KOH __________________________g__ | 11.20 |
| Zinc nitrate ____________________g__ | 0.50 |
| Benzotriazole __________________g__ | 3.50 |
| Sodium thiosulfate ______________g__ | 0.50 |
| N-benzyl-α-picolinium bromide ___g__ | 2.00 |

The processing liquid employed in the present invention is required to be quite viscous, that is, to have a jellylike consistency with a viscosity at 20° C. of a minimum of 50 centipoises and preferably in the range of 100,000 to 200,000 centipoises. A highly viscous and preferably thixotropic processing liquid is not required for image formation, but is important to minimize the problems involved in containing the liquid in a hand-held camera and makes the particular structure shown practicable. The processing liquid may be rendered viscous in a number of ways and by the inclusion of various viscosity-causing agents, preferably by the inclusion of a high molecular weight polymer. By way of example, the processing liquid according to the above formulation is imparted with the requisite viscosity by the addition of 4.00 grams of hydroxyethyl cellulose (high viscosity), commercially available from Hercules Powder Co. under the trade name "Natasol 250." Inorganic materials such as colloidal magnesium silicate are also suggested as having utility as thickening agents for the aforesaid liquid processing composition.

As previously noted, it has been the usual practice to distribute a viscous processing liquid of the foregoing type in a thin layer between the superposed image-recording and image-receiving sheets to effect the processing of the image-recording sheet and the formation of the diffusion transfer image on the image-receiving sheet. It has been found that improved results, i.e., faster processing with better image formation, are achieved if the liquid reagents are permeated into the image-recording layers prior to superpositioning of the image-recording and image-receiving layers and then the liquid impregnated image-recording layer is pressed into direct face-to-face contact with the image-receiving layer without the presence of a layer therebetween of a viscosity adding agent such as a high molecular weight polymer. The obvious way of achieving this is, in some manner, to bring the image-recording layers into contact with the nonviscous liquid as by immersing the image-recording sheets in a container of the nonviscous liquid. Such a system, of course, is unsuited for incorporation in a hand-held camera and has the further disadvantage of requiring the apparatus to come into contact with the highly alkaline (corrosive) liquid. Highly viscous liquids have been employed with great success to overcome both of these disadvantages since such liquids do not flow and spill easily and are confined to the film assemblages employed in the apparatus without contacting the apparatus itself.

The photographic system of the invention provides the advantages of both viscous and nonviscous processing liquids together with the advantages accruing from the employment of two plain rectangular sheets. This system includes a closed, expendable (inexpensive) container filled with the viscous processing liquid and the two sheets—an image-recording sheet and an image-receiving sheet—are advanced separately into the container and into superposition with one another and thence from the container. Advancement of the sheets is at a controlled rate permitting the image-recording layers to absorb a predetermined amount of the aqueous liquid phase, and development of the exposed image-recording material to progress to a predetermined extent. There may be some absorption of the liquid by the image-receiving sheet, however, this is unnecessary and, in the preferred embodiment, may be negligible. However, it should be pointed out that it is advantageous to keep the image-receiving layer in contact with the liquid for at least the same length of time as the photosensitive layers, because the small amount of liquid absorbed by the image-receiving layers facilitates diffusion transfer of the image-forming substances to the receiving layer. The two sheets are then pressed together in such a way as to squeeze the viscous liquid, specifically the high molecular weight polymer or other viscosity adding agent, from between the sheets so that no significant amount of the viscous liquid, including the polymer, remains between the sheets. The container includes two ingress passages for the separate sheets and a single egress passage for the superposed sheets (sandwich). The viscous liquid is also removed from the outer surfaces of the sheets as they emerge from the container so that the sandwich is essentially dry when it comes into contact with components of the apparatus. The viscous jellylike nature of the liquid or gel substantially reduces the problem of leakage; and removal of the high molecular weight polymer from the sheets is facilitated by the fact that preferred liquids of this type are thixotropic so that the liquid in the region of the surfaces of the sheets, particularly between the sheets, tends to flow substantially more readily than the remainder of the body of the liquid. The passage of the sheets through the container of liquid is timed so that the sheets are pressed into contact and the viscous liquid is squeezed from between the sheets before the image-forming substances (dyes) can diffuse into the liquid to the extent that the transfer image is impaired.

By way of recapitulation, this invention provides a transfer process wherein a photosensitive element is brought into contact with a mass of viscous liquid and held in contact with said mass of viscous liquid for a predetermined period after which the mass of viscous liquid is squeezed out from between said photosensitive element and a superposed second sheet which may carry one or more layers for receiving the diffusion transfer image and otherwise cooperating in the formation of the desired transfer image. This predetermined period constitutes, as a minimum, a period of time sufficient for the permeable layers of said photosensitive element (alone or together with permeable layer(s) carried by the second sheet) to absorb from said viscous mass a quantity of liquid sufficient to effect diffusion transfer processing, and, as a maximum, a period of time after which the image-forming substances would begin to diffuse laterally and/or into the mass of viscous liquid to an extent such that the photographic quality (particularly such elements of photographic quality as maximum density, color saturation and color separation) would be adversely affected. It will be recognized that the practical limits of this predetermined period will vary as a function of the permeability and swellability of the various layers and hence the rate at which the liquid is absorbed, the diffusion rates of the image-forming substances, etc., and may be readily and quickly determined by one skilled in the art for any given combination of photosensitive element, image-receiving element and viscous processing liquid. It will also be recognized that it is within the ability of one skilled in the art to vary such permeability and/or diffusibility to facilitate practice of this processing technique. Thus, for example, one may reduce the initial rate of diffusion by employing hydrolyzable derivatives of dye developers, as disclosed and claimed in the copending application of Edwin H. Land and Howard G. Rogers, Ser. No. 194,359, filed May 14, 1962.

Good results may be obtained if the permeable layers are maintained in contact with the body of viscous liquid for a period of the order of 2 to 4 seconds and depending upon the permeability of the layers, the viscosity of the liquid, the nature of the specific thickening agent employed and the path length, i.e., the length of the sheets in contact with the liquid, this time may be varied within the range of 1 to 10 seconds. The path length becomes a more significant factor as the contact time increases because the sandwich comprising the superposed sheets must be maintained intact for a predetermined period at the end of which the sheets are separated. Obviously, if the path length is short and the contact time is long, opposite ends of the sheets will remain in superposition for periods of time which may differ so substantially as to adversely affect the transfer image.

Figure 5:
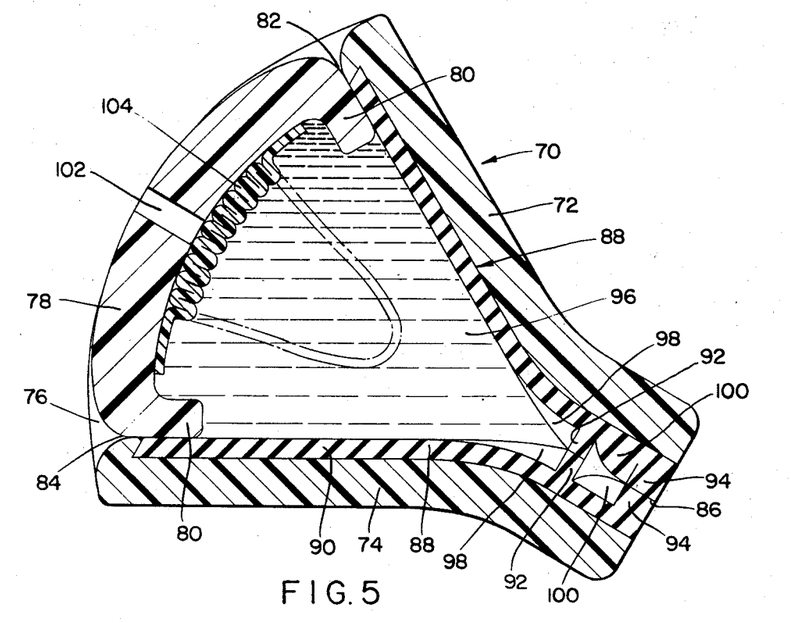
FIG. 5 is a sectional view of a container of liquid embodying the invention and adapted to use in the camera thereof.

Reference is now made to FIG. 5 of the drawings wherein there is illustrated a container of the type described adapted to hold a quantity of a viscous liquid sufficient to treat the image-recording sheets of a film assemblage with which it is supplied. The container, designated 70, is in the general form of a triangular prism and includes convergent side walls 72 and 74, end walls 76 and a curved side wall 78 extending between side walls 72 and 74 and end walls 76. Side wall 78 is joined at its ends to end walls 76 and includes lateral edge portions 80 extending inwardly adjacent side walls 72 and 74 to provide closed ingress passages 82 and 84 respectively. Side walls 72 and 74 and end walls 76 may be formed as a single unit, preferably of a substantially rigid polymer which lends itself to molding practices, and side wall 78 may also be formed of a polymer, preferably one having substantial resilience so that lateral edge portions 80 tend to spring outwardly sealing ingress passages 82 and 84. Side walls 72 and 74 converge toward one another and form an opening between their edges furthest from side wall 78 providing an egress passage 86. Means are provided for closing the egress passage and removing processing liquid from the outer surfaces of the sandwich comprising the superposed sheets as the sandwich is advanced through the egress passage from container 70. In the form shown, these last-mentioned means comprise a pair of members 88 formed of an elastomeric material and each including a thin wall section 90 adhered to and covering the inner surface of each of side walls 72 and 74 and extending into the ingress passages; and an edge section defining one side of egress passage 86 and provided with two squeegees 92 and 94. Squeegees 92 and 94 on members 88 extend into contact with one another and from end to end of the egress passage to seal the passage against the escape of the processing liquid and the admission of air.

Side walls 72 and 74, end wall 76 and side wall 78 cooperate to provide a chamber 96 in the general form of a triangular prism filled with the viscous processing liquid or gel. Container 70 is designed to fit within chamber 38 of camera 10 and processing of an exposed image-recording sheet is accomplished by simultaneously advancing an image-recording sheet 42 through ingress passage 84 and an image-receiving sheet 44 through ingress passage 82 so that the end portions of the sheets come into face-to-face contact at squeegees 92. The sheets are stiff enough to force open the ingress passages and move, leading edge first, adjacent the inner surfaces of wall sections 90 toward the squeegees and egress passage. As a means for guiding the edges of the sheets between squeegees 92 and 94, ramps 98 are provided on wall sections 90 leading up to squeegees 92 and ramps 100 are provided between squeegees 92 and 94 leading up to the latter. The ramps are separate from the squeegees so as not to interfere with the action of the squeegees and are staggered lengthwise of the container so as to provide for the squeegeeing of the surfaces of the sheets from edge to edge thereof. Although the paths of the two sheets through the container shown are of substantially equal length, this is of course unnecessary because the path length of the image-receiving sheet is not important and the sheet may be moved through a substantially shorted distance within the container.

Two pairs of squeegees are provided spaced from one another to insure the most complete removal of the liquid from the external surfaces of the sandwich and more secure sealing of the container both during movement of sheets through the container and when the container is not in use. The side walls of the container in the region of the egress passage in one form of the invention are rigid enough to exert sufficient pressure on the superposed sheets to squeeze the liquid from between the sheets as the sheets move in superposition between squeegees 92. In an alternative embodiment of the invention, extended sections 32 of side walls 20 and end section 36 of rear wall 34 of the camera cooperate with the side walls of the container to prevent the separation of the side walls and thereby squeeze the processing liquid from between the sheets so that the liquid, except for that absorbed into the sheets, remains within chamber 96.

Figure 6:
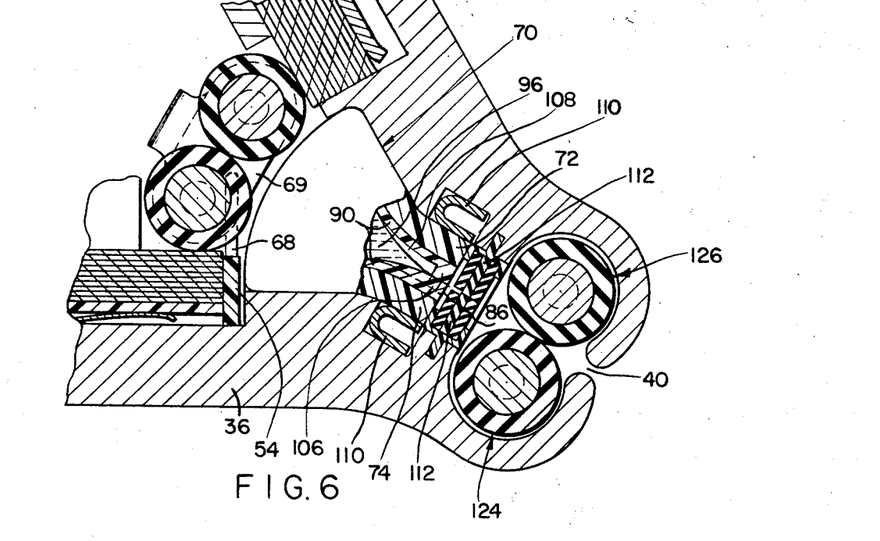
FIG. 6 is a fragmentary perspective view similar to FIGURE 1 illustrating another embodiment of the camera and container.

An alternative embodiment of container 70 and camera 10 is shown in FIG. 6 of the drawings, and is provided with only one pair of squeegees 106 and ramps 108 for sealing the container and for removing processing liquid from the outer surfaces of the sheets. The camera itself includes means in the form of springs 110 for biasing side walls 72 and 74 of the container toward one another to seal the egress passage and cause the squeegees to press against the sheets as they are withdrawn from the container through the egress passage; and means, shown as squeegees 112, mounted adjacent opposite sides of egress passage 86 for engaging the sheets and removing processing liquid from the exterior surfaces thereof. Squeegees 112 are designed to be removable from the camera housing either for replacement along with each new container of processing liquid, or for cleaning liquid from the squeegees. In an alternative embodiment, other means such as absorbent applicators may be provided in the camera housing for rubbing against and removing processing liquid from the surfaces of the sandwich as it emerges from container 70 through egress passage 86.

During the processing of successsive image-recording sheets part of the liquid is absorbed into the image-recording sheet and the amount of liquid absorbed is determined, as is the extent of image development, by the rate at which the image-recording sheet is moved through chamber 96 between ingress passage 84 and egress passage 86. In order to insure uniform processing of successive image-recording sheets, chamber 96, or at least the portion thereof through which the sheets advance, is required to remain filled with the processing liquid so that the period during which each image-recording sheet is in contact with the liquid is the same for each succeeding sheet, even though some of the liquid is absorbed by successive sheets, as long as successive sheets are advanced at the same rate. To provide for this condition, side wall 78 is provided with an opening 102 and a diaphragm 104 is secured to the inner surfaces of side wall 78 around opening 102. The diaphragm is initially provided in a folded condtion as shown in FIG. 5 and is free to expand under the pressure of the atmosphere to take the place of liquid absorbed into and withdrawn from the container by the sheets. The container is filled with more liquid than is required so that the reactive agents in the aqueous liquid phase—to be differentiated from the thickening agent (high molecular weight polymer)—remain in the container in sufficient quantity and concentration to process the last of a sequence of image-recording sheets as well as the first. Diaphragm 104 is free to move inwardly to the position shown, for example, in broken lines in FIG. 5 to take the place of liquid withdrawn during treatment of a succession of image-recording sheets.

Camera 10 includes means for advancing an image-recording sheet 42 from container 46 through ingress passage 84 into chamber 96 into superposition with an image-receiving sheet 44 while simultaneously advancing an image-receiving sheet 44 from chamber 30 within the camera through ingress passage 82 into chamber 96; and advancing both sheets in superposition through egress passage 86 from the camera. These means, shown in FIGS. 1, 7 and 8, include a first pair of feed rolls 114 and 116 mounted on support members 69 in engagement with the leading end portions of, respectively, the end or foremost image-recording sheet 42 and the end or innermost image-receiving sheet 44. Feed rolls 114 and 116 each includes, respectively, a shaft 118 and 120 covered with a material having a high coefficient of friction such as an elastomeric or polymeric foam, for example, polyvinyl urethane foam. Feed rolls 114 and 116 are substantially shorter than the widths of the sheets so that feed roll 114 and support members 69 can be located within container 46 between side walls 50 thereof. The foremost sheet within container 46 is supported against locating members 62 substantially in the plane of ingress passage 84 and the innermost or end sheet 44 within chamber 30 is supported against the outer surface of inner side wall 28 substantially in the plane of ingress passage 82. Feed rolls 114 and 116 are mounted in fixed position with their axes substantially in a common plane in contact with one of the sheets, that is, sheet 60 or one of sheets 42 in container 46 is biased against feed roll 114 by springs 66; and sheets 44 are biased against feed roll 116 by a spring 122 mounted in chamber 30 adjacent the feed roll.

Figure 7:
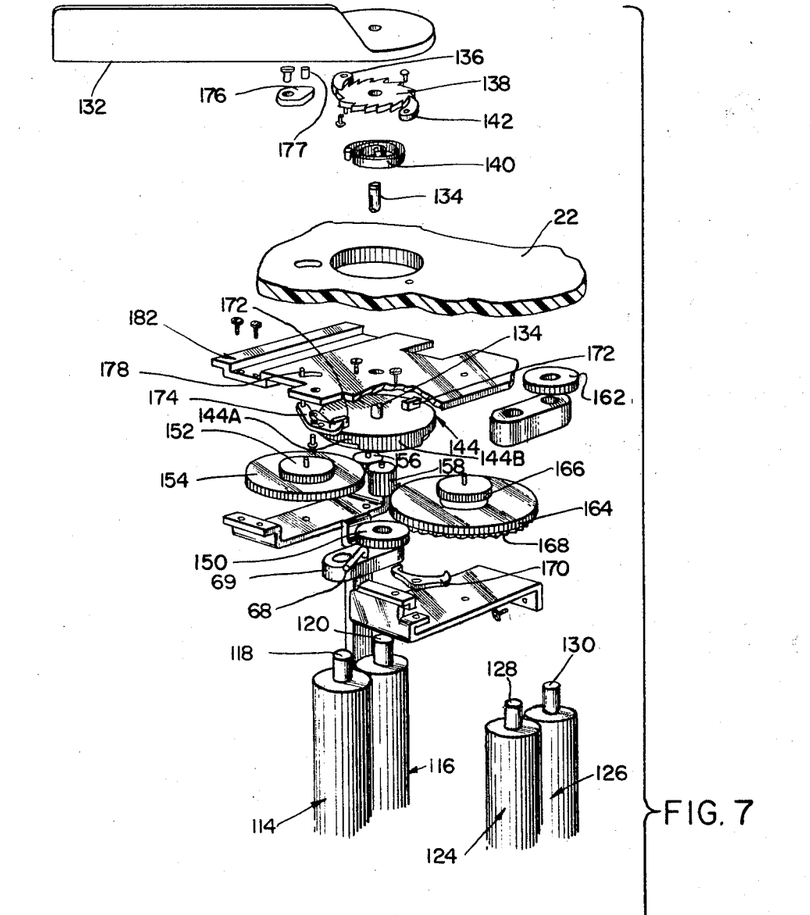
FIG. 7 is an exploded perspective view showing the operating mechanisms of the camera.
Figure 8:
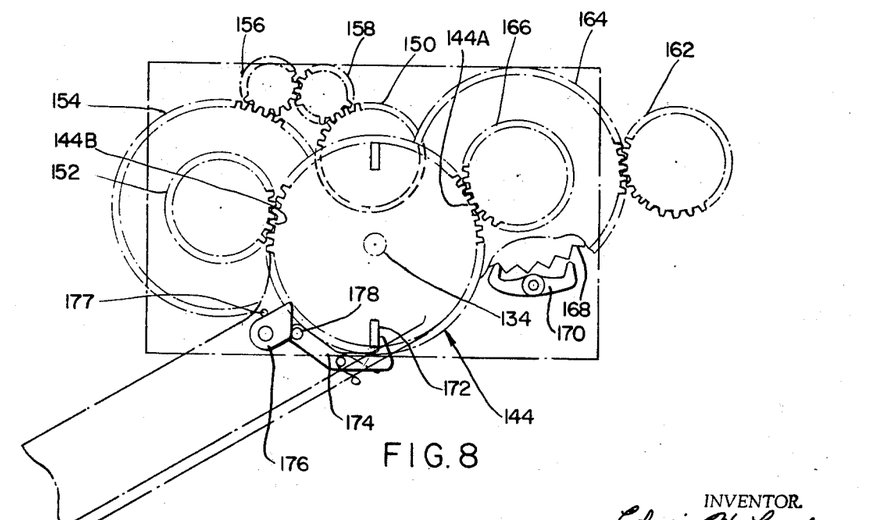
FIG. 8 is a schematic, plan view showing the components of the mechanisms of FIG. 7.

The camera includes a mechanism, shown in FIGS. 7 and 8, for rotating rolls 114 and 116 to advance a pair of sheets through and from container 70 a sufficient distance to permit the leading ends of the sheets to be engaged by a second pair of feed rolls 124 and 126 provided within the camera adjacent exit slot 40 for drawing the two sheets through the container and advancing the sandwich comprising the superposed sheets from the camera through exit slot 40. Rolls 124 and 126 are similar to rolls 114 and 116 in that they comprise, respectively, shafts 128 and 130 covered with a material, preferably an elastomeric foam, having a high coefficient of friction. The mechanism for rotating both pairs of said rolls is manually operated and is designed to rotate the rolls so that each pair of rolls advances the sheets at the same line or rate. As previously noted, rolls 114 and 116 are required to be rotated sufficiently to advance an image-recording and second sheet through the container of processing liquid into the bite of rolls 124 and 126. When this occurs, driving of rolls 114 and 116 is terminated and rotation of rolls 124 and 126 is continued to advance the sheets completely from the camera. Driving of rolls 114 and 116 is terminated prior to advancement of an image-recording and second sheet completely into the container so that the rolls do not commence prematurely the advancement of the next successive image-recording and image-receiving sheet into the container, that is, during advancement of the previous sheets.

The drive mechanism for the two pairs of feed rolls, shown in FIGS. 7 and 8, includes a manually operable crank 132 mounted on the exterior of the camera housing on a shaft 134 projecting through upper wall 22 of the housing. Crank 132 is pivotable through a predetermined distance, for example, 180°, in a conterclockwise direction to rotate rolls 114, 116, 124 and 126 sufficiently to advance an image-recording and second sheet through the container from the camera. The crank is mounted on shaft 134 for movement with respect to the shaft and is coupled with the shaft to rotate the latter through a pawl 136 which engages a rachet wheel 138 freely mounted on shaft 134 and coupled with a torsion spring 140 in turn coupled with shaft 134. It should be noted that the coupling between crank 132 and shaft 134 is such that counterclockwise torque applied to crank 132 is transmitted through pawl 136, ratchet 138 and spring 140 to shaft 134, but the crank is free to move in a clockwise direction without imparting any motion to shaft 134. A second pawl 142 is provided mounted on the camera housing for preventing clockwise rotation of ratchet wheel 138 under the bias of torsion spring 140. The mechanism includes a transmission for coupling shaft 134 to the feed rolls comprising a drive gear 144 keyed to shaft 134 and including a 360° section 144A, i.e., having teeth around 360°, and two sectors 144B spaced 180° apart and each having teeth extending around a relatively small portion of its periphery, for example, 75°. During each sheet advancement cycle, feed rolls 114 and 116 are driven by one of sectors 144B and feed rolls 124 and 126 are driven by 360° section 144A. A gear 150 is provided on shaft 120 of feed roll 116 and feed roll 114 is driven by engagement with feed roll 116 which in turn is coupled to one of sectors 144B of gear 144 through a gear train comprising gears 152, 154, 156 and 158, gear 152 being meshed with a sector 144B and gear 158 being meshed with gear 150 on shaft 120 of feed roll 116. The drive mechanism is constructed so that at the start of the sheet advancement cycle, secton 144B of gear 144 engages and rotates gear 152 to rotate feed rolls 114 and 116 during the initial portion of the sheet advancement cycle and sector 144B is then disengaged from gear 152 so that feed rolls 114 and 116 are not driven during the remaining portion of the sheet advancement cycle.

Feed rolls 124 and 126 are driven throughout the sheet advancement cycle by a gear 162 connected to shaft 130 and coupled through gear 166 to 360° section 144A of gear 144. The processing of the sheets is determined by the rate at which the sheets are advanced through container 70, and, as previously noted, should provide a time in contact with the liquid at least long enough for the permeable layers to absorb a quantity of liquid sufficient to effect processing. The rate of sheet advancement is, of course, dependent upon this minimum time and the length of the path through the liquid. By way of example, a four and one-half inch sheet may be advanced through a container with a one-half inch path length in a period of the order of twenty to thirty seconds providing for a time of contact with the liquid of the order of 2.2 to 3.3 seconds. Accordingly, the sheet advancement mechanism includes means for controlling the rate at which the two pairs of feed rolls rotate to advance the sheets. These means include a conventional star wheel 168 and pallet 170 mechanism, the former being mounted on gear 164. It will be apparent that the drive mechanism is very similar in construction to a spring powered clock or similar timing device, spring 140 providing the motive power for operating the devices so that other conventional rotation timing devices may be substituted for the star wheel and pallet shown. In order to insure advancement of the feed rolls through a predetermined distance in response to rotation of crank 132 through 180°, spring 140 may be pretensioned. For this reason, a limit stop is provided in the mechanism for terminating each sheet advancement cycle and in the form shown comprises lugs 172 mounted 180° apart on gear 144 adapted to be engaged by a latch lever 174 pivotally mounted on a support member 182 provided for mounting components of the drive mechanism. Latch lever 174 is disengaged from a lug 172 near the commencement of a sheet advancement cycle by a lever 176 mounted on crank 132 adapted to engage an upstanding member 178 on the end of lever 174 projecting through slots in member 182 and wall 22. Lever 176 is pivotally mounted on crank 132 and is biased against a stop pin 177 so that it engages and pivots lever 174 during the counterclockwise rotation of the crank and is merely deflected without pivoting lever 174 during return (clockwise) movement of the crank to its initial position. A torsion spring (not shown) may be provided coupled between crank 132 and either ratchet wheel 138 or upper wall 22 of the housing for returning crank 132 to its initial position following rotation of the crank through 180° to tension torsion spring 140.

To load and operate the camera of the invention, the rear housing section is pivoted to an open position, a stack of image-receiving sheets 44 is introduced into chamber 30, a container 46 of image-recording sheets is positioned against the rear edges of locating members 62, a container 70 of processing liquid is introduced into extended section 32 between side wall 20 and end section 36 and the rear housing section of the camera is then pivoted into a closed position. Prior to making an exposure, crank 132 is pivoted in a counterclockwise direction through 180° to feed cover sheet 60 through container 70 from the camera housing. The end or innermost sheet in chamber 30 may be a dummy sheet rather than an image-receiving sheet so that an image-receiving sheet is not advanced through the container together with cover sheet 60. The loaded camera is then in readiness to expose and process the image-recording sheets, each processing operation involving the rotation of crank 132 through 180° in a counterclockwise direction. When the image-recording and image-receiving sheets, which have been loaded into the camera, have been expended, container 70 may be discarded together with container 46 in which the image-recording sheets were initially provided.

The apparatus, product and process of the invention provide the solutions for a number of related problems involved in the production of photographic diffusion transfer prints, particularly high quality prints in full color. It is now possible by virtue of the invention, to produce color transfer prints of improved quality, less expensively and in a shorter time in a hand-held camera, because the layer of liquid heretofore employed in such processes is eliminated; the film materials employed have been greatly simplified to the extent that they can be substantially less expensive; a way is now provided for containing a liquid and impregnating sheets with the liquid within a hand-held camera in which the sheets are exposed; and the processing operations are performed by a manually operated camera in a reliable and substantially automatic manner by virtue of the novel and inventive concepts embodied in the apparatus, product and process.

Since certain changes may be made in the above apparatus, product and process without departing from the scope of the invention herein involved, it is intended that all matter contained in the above description or shown in the accompanying drawings shall be interpreted as illustrative and not in a limiting sense.

What is claimed is:

1. Photographic apparatus for exposing an image-recording sheet, superposing said exposed sheet with a second sheet and treating said sheets with a liquid, said apparatus comprising, in combination:
    means for holding a container filled with said liquid and having closed ingress passages and juxtaposed portions defining a closed egress passage;
    means for supporting said image-recording sheet in position for exposure;
    means for supporting said second sheet in a position apart from said image-recording sheet;
    engagement means for frictionally engaging said sheets;
    drive means for moving said engagement means to advance said sheets along separate convergent paths through said ingress passages and said container into superposition at said egress passage and in superposition from said container;
    means for engaging and causing said portions to apply compressive pressure to said superposed sheets within said egress passage and squeeze said liquid from between said sheets; and
    means outside of said container adjacent said egress passage for removing liquid from the exterior of said superposed sheets as said sheets emerge from said egress passage.

2. The photographic apparatus of claim 1 in which second engagement means are provided adjacent said egress passage for frictionally engaging said superposed sheets upon emergence thereof from said egress passage; and said drive means include means for moving said second engagement means in engagement with said superposed sheets to withdraw said sheets from said container at the same rate as said sheets are advanced by the first mentioned engagement means.

3. Photographic apparatus for exposing an image-recording sheet, superposing said exposed sheet with a second sheet and treating said sheets with a liquid, said apparatus comprising, in combination:
  means for holding a container, filled with said liquid and having closed ingress passages and juxtaposed portions defining a closed egress passage;
  means for supporting said image-recording sheet in position for exposure; means for supporting said second sheet in a position apart from said image-recording sheet;
  first engagement means for frictionally engaging said sheets at said positions;
  drive means for moving said first engagement means to advance said sheets along separate convergent paths into and through said ingress passages into said container, into superposition at said egress passage and in superposition through said egress passage from said container;
  means for engaging and urging said portions of said container toward one another to apply compressive pressure to said superposed sheets within said egress passage and squeeze said liquid from between said sheets; and
  second engagement means located adjacent said egress passage for frictionally engaging said superposed sheets upon emergence thereof from said egress passage,
  said drive means including means for moving said second engagement means in engagement with said superposed sheets to draw said sheets from said container through said egress passage at the same rate as said sheets are advanced by said first engagement means.

4. The photographic apparatus of claim 4 in which said drive means include means for maintaining the rate of advancement of said sheets within a predetermined range.

5. Photographic apparatus for exposing and treating with a liquid successive photographic image-recording sheets, said apparatus comprising, in combination:
  means for holding a container filled with said liquid and having two closed ingress passages and juxtaposed sections defining a closed egress passage;
  means for holding a plurality of said image-recording sheets in a first stack with an end sheet supported in position for exposure with an edge of said end sheet located adjacent one of said ingress passages;
  means for holding a plurality of second sheets in a second stack apart from said image-recording sheets with an edge of an end second sheet located adjacent the other of said ingress passages;
  first engagement means for frictionally engaging said end image-recording and second sheets in said stacks;
  drive means for moving said engagement means to advance said end sheets from said stacks with said edges foremost into and through said ingress passages, into and through said container into superposition at said egress passage and in superposition from said container;
  means for causing said sections to apply compressive pressure to said superposed sheet within said egress passage and squeeze said liquid from between said sheets; and
  second engagement means located adjacent said egress passage for engaging said superposed sheets upon emergence thereof from said egress passage;
  said drive means including means for moving said second engagement means in engagement with said superposed sheets to withdraw said sheets from said container at the same rate as said sheets are advanced by said first engagement means.

6. The photographic apparatus of claim 5 in which said drive means include means for maintaining the rate of advancement of said sheets within a predetermined range.

7. Photographic apparatus for exposing and treating with a liquid successive photographic image-recording sheets, said apparatus comprising, in combination:
  means for holding a plurality of said image-recording sheets in a first stack with an end sheet supported in position for exposure;
  means for holding a plurality of second sheets in a second stack in a position apart from said first stack;
  a container for holding a viscous liquid having two closed ingress passages and sections defining a closed egress passage;
  engagement means for frictionally engaging said end image-recording sheet in said first stack and an end second sheet in said second stack;
  drive means for moving said engagement means to advance said end sheets from said stacks into and through said ingress passage into said container into superposition at said egress passage and from said container; and
  means for causing said sections of said container to compress said superposed sheets within said egress passage and squeeze said liquid from between said sheets.

8. The photographic apparatus of claim 7 in which said sections defining said egress passage include adjacent walls providing the sides of said egress passage, and said walls include opposed members cooperating to close said egress passage and for engaging said sheets to remove said liquid from the outer surfaces thereof during movement of said sheets through said egress passage.

9. The photographic apparatus of claim 7 in which each of said ingress passages is defined by convergent walls comprising portions of said container biased toward one another.

10. The photographic apparatus of claim 7 in which means are provided outside of said container adjacent said egress passage for engaging said superposed sheets upon emergence thereof from said egress passage and removing said liquid from the exterior of said sheets.

11. The photographic apparatus of claim 10 in which second engagement members are provided adjacent the last-mentioned means for frictionally engaging said superposed sheets and said drive means include means for moving said second engagement means in engagement with said superposed sheets to withdraw said sheets from said container at the same rate as said sheets are advanced by the first-mentioned engagement means.

12. Photographic apparatus for exposing and treating with a liquid successive photographic image-recording sheets, said apparatus comprising in combination:
  means for holding a plurality of said image-recording sheets in a first stack with an end sheet supported in position for exposure;
  means for holding a plurality of second sheets in a second stack in a position apart from said first stack;
  a container for a viscous liquid agent including said liquid having two closed ingress passages and sections defining a closed egress passage;
  engagement means for frictionally engaging said end image-recording sheet in said first stack and an end second sheet in said second stack; and
  drive means for moving said engagement means to advance said end sheets from said stacks into and through said ingress pasasge, into said container into superposition at said egress passage, and through said egress passage from said container;
  said sections including adjacent walls providing the sides of said egress passage and being biased toward one another with a force sufficient to prevent escape of said processing agent and squeeze said processing agent from between said sheets during movement thereof through said egress passage.

13. The photographic apparatus of claim 12 in which said walls include opposed members cooperating to close said egress passage and comprising squeegees for engaging said sheets to remove said processing agent from the outer surfaces thereof during movement of said sheets through said egress passage.

14. In photographic apparatus for treating a photographic image-recording sheet with a liquid absorbed into said sheet, in combination:
 a container including walls defining a cavity;
 a quantity of a viscous processing agent including said liquid contained within said cavity;
 said container including sections cooperating to provide two closed ingress passages at one side of said cavity for admitting said image-recording sheet and a second sheet separately to said cavity, said sections being biased closed with forces sufficient to preclude escape of said agent while permitting said sheets to be moved into and through said passages;
 said container including other sections cooperating to provide a closed egress passage at the opposite side of said cavity through which said sheets are movable in superposition from said cavity;
 said ingress and egress passages being arranged to guide said sheets through said container along convergent paths into superposition within said container at said egress passage;
 said other sections of said container being biased toward one another with a force sufficient to prevent escape of said agent through said egress passage and squeeze substantially all of said viscous processing agent from between said sheets.

15. The photographic apparatus of claim 14 in which said processing agent includes said liquid and a high molecular weight polymer.

16. The photographic apparatus of claim 14 including means for positioning said sheets apart from one another outside of said container with edges of said sheets located adjacent said ingress passages and means for engaging said sheets exterior of said container and moving said sheets with said edges foremost into and through said ingress passages and said cavity into superposition and through said egress passage from said container.

17. The photographic apparatus of claim 16 in which the last-mentioned means includes means for advancing said sheets through said container at a linear rate within a predetermined range to provide for absorption by said image-recording sheet of a substantially predetermined quantity of said liquid.

18. The photographic apparatus of claim 14 in which said other sections include adjacent walls providing the sides of said egress passage and said walls include opposed member cooperating to close said egress passage and for engaging said sheets to remove said liquid from the outer surfaces thereof during movement of said sheets through said egress passage.

19. A photographic product for treating a photographic image-recording sheet with a liquid comprising, in combination:
 a container having walls defining a liquid containing chamber;
 a quantity of a viscous liquid filling said chamber;
 said container including first sections cooperating to provide two ingress passages at one side of said chamber through which said image-recording sheet and a second sheet are movable separately into said chamber, each of said ingress passages having convergent side walls biased into contact with one another to close said passages against escape of said liquid;
 said container including second sections cooperating to provide an egress passage at the opposite side of said chamber through which said sheets are movable in superposition from said chamber;
 said first and second sections and said walls of said container being constructed for guiding said sheets through said container along convergent paths into superposition within said chamber at said egress passage;
 said second sections including wall portions biased toward one another with a force sufficient to close said egress passage and squeeze said processing agent from between said superposed sheets during movement thereof through said egress passage.

20. The photographic product of claim 19 in which said viscous liquid comprises an nonviscous liquid capable of being absorbed into at least a layer of said image-recording sheet and a high molecular weight polymer rendering said liquid viscous and said wall portions are biased toward one another with a force sufficient to squeeze substantially all of said polymer from between said sheets.

21. A photographic product for treating a photographic image-recording sheet with a liquid comprising, in combination:
 a container having walls defining a liquid containing chamber;
 a quantity of a viscous liquid filling said chamber;
 said container including first sections cooperating to provide two ingress passages at one side of said chamber through which said image-recording sheet and a second sheet are movable separately into said chamber, each of said ingress passages having convergent side walls biased into contact with one another to close said passages against escape of said liquid;
 said container including second sections cooperating to provide an egress passage at the opposite side of said chamber through which said sheets are movable in superposition from said chamber;
 said first and second sections and said walls of said containers being constructed for guiding said sheets through said container along convergent paths into superposition within said chamber at said egress passage;
 said second section including wall portions defining said egress passage and biased toward one another to close said egress passage and prevent escape of said liquid, each of said wall portions including squeegees extending across said egress passage substantially perpendicularly to the direction of movement of said sheets toward the opposite wall portion and having opposed surfaces cooperating to close said egress passage, said squeegees including edges bordering said surfaces for engaging the outer surfaces of said superposed sheets within said egress passage to remove said liquid from said surfaces during movement of said sheets through said egress passage.

22. The photographic product of claim 21 including ramps on said wall portion within said egress passage, said ramps on each of said wall portions being disposed beteen ramps on the opposite wall portion and extending from within said chamber to said squeegees and having surface inclined with respect to the plane of movement of said sheets through said egress passage.

23. The photographic product of claim 22 in which said wall portions are biased toward one another with a force sufficient to squeeze all but a negligible amount of said viscous liquid from between said superposed sheets during movement of said sheets through said egress passage.

24. In the production of a photographic transfer image by a process involving the formation of an imagewise distribution of transferable image-forming substances in a layer on one sheet and transfer of said substances to a layer on another sheet, the steps of:
 moving said sheets into a container containing a viscous liquid agent comprising a liquid capable of being absorbed by at least said layer on said one sheet and, when so absorbed, initiating the formation of said image-forming substances, and a high molecular weight polymer rendering said liquid agent viscous; moving said sheets along convergent paths through said viscous liquid within said container at a rate such that an amount of said liquid sufficient to effect the formation of said image-forming substances is absorbed by said layer on said one sheet and formation of said image-forming substances is initiated and advanced to a substantially predetermined extent;

during movement of said sheets through said container, guiding said sheets into superposed face-to-face relation and from said container through an egress passage within said container; and during movement of said sheets through said passage, squeezing substantially all of said polymer from between the facing surfaces of said sheets and retaining said polymer within said container by applying compressive pressure to said sheets within said passage during movement of said sheets in superposition therethrough.

25. The process of claim 24 in which said sheets are advanced into said container edge foremost through normally closed ingress passages, the edges of said sheets acting to open said ingress passages sufficiently to admit said sheets without allowing said viscous liquid agent to escape from said container through said ingress passages.

26. The process of claim 24 in which said egress passage is normally closed and said sheets are advanced in superposition edge foremost through said egress passage, opening said egress passage sufficiently to admit said sheets without allowing said viscous liquid agent to escape from said container through said egress passage.

27. The process of claim 24 in which said viscous liquid agent is squeezed from said outer surfaces of said sheets within said egress passage.

28. The process of claim 24 in which said sheets are engaged outside of said container and pushed edge foremost into, through and from said container, the leading edge portions of said superposed sheets are engaged outside of said container upon emergence therefrom and said sheets are pulled without interruption of movement and at the same rate as they are pushed into and through container.

29. The process of claim 28 in which said superposed sheets are wiped to remove said agent therefrom as said sheets emerge from said container prior to being engaged and pulled from said container.

30. In the production of a photographic transfer image by a process involving exposure of light-sensitive material in a layer on one sheet to form an image in said layer, formation of an imagewise distribution of transferable image-forming substances in said one layer and transfer of said image-forming substances to a layer on another sheet, the steps of:

moving said sheets into contact with a body of a viscous liquid agent comprising a liquid capable of being absorbed by at least said layer on said one sheet and, when so absorbed, initiating the formation of image-forming substances transferable by diffusion from said layer on said one sheet, and a viscosity adding ingredient rendering said liquid agent viscous;

moving said sheets with predetermined areas thereof in contact with said liquid agent, relative to said body of said liquid agent at a rate such that an amount of said liquid sufficient to effect the formation of said transferable image-forming substances is absorbed by said layer on said one sheet and formation of said image-forming substances is initiated and advanced to a substantially predetermined extent;

during movement of said sheets in contact with said body of said liquid agent, guiding said sheets into superposed face-to-face relation and then from contact with said body of said liquid agent; and during movement of said sheets from contact with said body of said liquid agent, squeezing substantially all of said viscosity adding ingredient from between the facing surfaces of said sheets and returning said ingredient to said body of liquid by applying compressive pressure to said sheets as said sheets are guided into superposed relation;

said sheets being superposed and moved from contact with said body of said liquid agent and said viscosity adding ingredient being squeezed from between said sheets before diffusion of said image-forming substances progresses to the extent of impairing said transfer image due to diffusion of said image-forming substances within said liquid agent.

31. The method of claim 30 in which said body of liquid is contained in a container having two ingress passages and one egress passage and said sheets are moved from outside said container through said ingress passages into said container into superposition within said container and in superposition from said container through said egress passage.

32. The method of claim 31 in which said ingress and egress passages are normally closed and are forced open to admit said sheets by pushing said sheets with their leading edges foremost through said passages from outside of said container.

33. The method of claim 30 in which said body of said liquid agent is contained so as to contact predetermined areas of surfaces of said sheets and said sheets are moved relative to said body of said liquid agent at a substantially constant predetermined speed.

34. In the production of a photographic transfer image by a process involving exposure of light-sensitive material in a layer on one sheet to form a latent image in said layer, formation of an imagewise distrbuton of transferable image-forming substances in said one layer and transfer of said image-forming substances to an image-receiving layer carried on one of said one sheet and a second sheet in superposed relationship with said one sheet, the steps of:

providing, in contact with said one sheet, a body of a viscous liquid agent comprising a liquid capable of being absorbed by at least said layer on said one sheet and, when so absorbed, initiating development of said latent image and imagewise formation of image-forming substances transferable by diffusion from said layer on said one sheet, and a viscosity adding ingredient rendering said liquid agent viscous;

maintaining said one sheet in contact with said body of viscous liquid for a predetermined period of time so that an amount of said liquid sufficient to effect the formation of said transferable image-forming substances is absorbed by said layer on said one sheet and said imagewise formation of said image-forming substances is initiated;

after said predetermined period superposing said sheets and squeezing substantially all of said viscosity adding ingredient from between the facing surfaces of said sheets by applying compressive pressure to said sheets as said sheets are being superposed;

said sheets being superposed and said viscosity adding ingredient being squeezed from between said sheets before diffusion of said image-forming substances progresses to the extent of impairing said transfer image due to diffusion of said image-forming substances within said liquid agent.

References Cited

UNITED STATES PATENTS

| 2,520,641 | 8/1950 | Land | 95—13 |
| 3,216,342 | 11/1965 | Mergens | 95—94 |

FOREIGN PATENTS

| 261.311 | 5/1963 | Australia. |

JOHN M. HORAN, *Primary Examiner.*